US009634337B2

(12) United States Patent
Saito et al.

(10) Patent No.: US 9,634,337 B2
(45) Date of Patent: Apr. 25, 2017

(54) FREEZE-RESISTANT FUEL CELL CONDENSERS

(75) Inventors: Kazuo Saito, Glastonbury, CT (US); Sitaram Ramaswamy, West Hartford, CT (US); Masaki M. Yokose, Tolland, CT (US); Richard R. Phillips, West Hartford, CT (US); Michael L. Perry, Glastonbury, CT (US); Catherine M. Goodrich, Holyoke, MA (US)

(73) Assignee: AUDI AG, Ingolstadt (DE)

( * ) Notice: Subject to any disclaimer, the term of this patent is extended or adjusted under 35 U.S.C. 154(b) by 558 days.

(21) Appl. No.: 13/261,768

(22) PCT Filed: May 4, 2011

(86) PCT No.: PCT/US2011/000789
§ 371 (c)(1),
(2), (4) Date: Oct. 29, 2013

(87) PCT Pub. No.: WO2012/150917
PCT Pub. Date: Nov. 8, 2012

(65) Prior Publication Data
US 2014/0065505 A1 Mar. 6, 2014

(51) Int. Cl.
*H01M 8/04* (2016.01)
*H01M 8/04007* (2016.01)
(Continued)

(52) U.S. Cl.
CPC .... *H01M 8/04059* (2013.01); *F28D 15/0266* (2013.01); *F28F 1/32* (2013.01);
(Continued)

(58) Field of Classification Search
CPC ......... H01M 8/04029; H01M 8/04164; H01M 8/04059; F28F 3/025; F28F 1/32; F28F 17/005; F28F 2245/02; Y02E 60/50
See application file for complete search history.

(56) References Cited

U.S. PATENT DOCUMENTS 5,514,248 A * 5/1996 Okuda .................. F25B 39/022
159/28.6
7,504,170 B2 3/2009 Reiser et al.
(Continued)

FOREIGN PATENT DOCUMENTS

CN 101107743 A 1/2008
EP 0 825 406 A2 2/1998
(Continued)

OTHER PUBLICATIONS

International Search Report, mailed Jan. 17, 2012, for International Application No. PCT/US2011/000789, 2 pages.
(Continued)

*Primary Examiner* — Muhammad Siddiquee
(74) *Attorney, Agent, or Firm* — Seed Intellectual Property Law Group LLP

(57) ABSTRACT

Cathode exhaust of an evaporatively cooled fuel cell stack (50) is condensed in a heat exchanger (12a, 23, 23a) having extended fins (14, 25a) or tubes (24, 24a) to prevent pooling of condensate, and/or having the entire exit surface of the condenser rendered hydrophilic with wicking (32) to conduct water away. The cathode exhaust flow paths may be vertical or horizontal, they may be partly or totally rendered hydrophilic, and if so, in liquid communication with hydrophilic end surfaces of the condenser, and the condensers (49) may be tilted away from a normal orientation with respect to earth's gravity.

6 Claims, 5 Drawing Sheets

(51) Int. Cl.
  *H01M 8/04119* (2016.01)
  *F28F 3/02* (2006.01)
  *F28D 15/02* (2006.01)
  *F28F 1/32* (2006.01)
  *F28F 17/00* (2006.01)
(52) U.S. Cl.
  CPC ............ *F28F 3/025* (2013.01); *F28F 17/005* (2013.01); *H01M 8/04164* (2013.01); *F28F 2245/02* (2013.01)

(56) References Cited

U.S. PATENT DOCUMENTS

| | | | | |
|---|---|---|---|---|
| 2005/0217303 | A1* | 10/2005 | Gillan | F24F 5/0035 62/314 |
| 2006/0048540 | A1* | 3/2006 | Voss | B01D 5/0009 62/606 |
| 2006/0141330 | A1 | 6/2006 | Reiser et al. | |
| 2006/0141331 | A1 | 6/2006 | Reiser et al. | |
| 2008/0038610 | A1* | 2/2008 | Darling | H01M 8/0267 429/437 |
| 2008/0307815 | A1* | 12/2008 | Daddis, Jr. | A47F 3/0482 62/246 |
| 2010/0047634 | A1* | 2/2010 | Nguyen | H01M 8/04022 429/513 |
| 2010/0071868 | A1* | 3/2010 | Reifel | B23P 15/26 165/47 |
| 2010/0291457 | A1* | 11/2010 | Wang | H01M 8/04029 429/438 |

FOREIGN PATENT DOCUMENTS

| | | |
|---|---|---|
| JP | 55-73187 U | 5/1980 |
| JP | 56-144271 U | 10/1981 |
| JP | 1-123075 U | 8/1989 |
| JP | 5-41230 A | 2/1993 |
| JP | 6-74670 A | 3/1994 |
| JP | 6-147785 A | 5/1994 |
| JP | 6-194093 A | 7/1994 |
| JP | 9-120831 A | 5/1997 |
| JP | 2001-64658 A | 3/2001 |
| JP | 2002-313376 A | 10/2002 |
| JP | 2007-523316 A | 8/2007 |
| JP | 2008-525989 A | 7/2008 |
| JP | 2010-25478 A | 2/2010 |
| JP | 2010-249388 A | 11/2010 |
| JP | 2010-255916 A | 11/2010 |
| JP | 2011-25191 A | 2/2011 |
| WO | 2009/108255 A2 | 9/2009 |
| WO | 2009/116194 A1 | 9/2009 |

OTHER PUBLICATIONS

Extended European Search Report, dated Dec. 10, 2014, for corresponding European Application No. 11864838.5—1359 / 2705561, 14 pages.

* cited by examiner

FREEZE-RESISTANT FUEL CELL CONDENSERS

TECHNICAL FIELD

Condensing heat exchangers, such as those suitable for use in fuel cell systems employing evaporative cooling, have a tendency to become plugged with pooled condensate which accumulates as the cathode exhaust flow is diminished during shutdown of the fuel cell system, or during low-power operation. In cold climates, the water which occludes the condensate path at low cathode flows may freeze, thus blocking the path of air flow through the cathodes and hampering a subsequent startup. Pooling of condensate is prevented either with a) fins of plate-fin type heat exchangers extended beyond the plates, or b) finned tube type heat exchangers having tubes with shaped ends, or c) by providing the ends of the cathode exhaust flow paths with hydrophilic surfaces that touch wicking which carries away the water.

BACKGROUND ART

Fuel cell systems employing evaporative cooling, such as in U.S. Pat. No. 7,504,170 (incorporated herein by reference) require condensing heat exchangers that are compact and efficient. This is especially so in fuel cell systems used in mobile applications, such as electric vehicles powered by fuel cells. Plate-fin type heat exchangers and finned tube type heat exchangers are suitable for such use. These heat exchangers, however, generally consist of very narrow flow channels with very dense heat transfer fins and tubes or plates to maximize the heat transfer area in the condensation flow side, within the limited space.

Because the condensation channels are so narrow, when a fuel cell system is shut down, water easily remains in the flow channels due to the lack of a sufficient moving fluid volume to conduct the condensate. The condensate tends to pool across the narrow channels after shutdown and will freeze in sub-freezing environments. The next startup is hampered since the air flow channels are partly or entirely blocked by ice. Furthermore, ice blockage will create structural stresses which may damage the condenser. In some situations, particularly if both the condensate flow and the cooling flow are required to be horizontal, condensate water may pool up and plug some of the flow channels during operation of the fuel cell system, especially during low-power operation.

SUMMARY

In one embodiment, condensing heat exchangers are provided with hydrophilic drainage at the outflow end of the condensate flow channels. At least the outflow end surface of the heat exchanger is caused to be hydrophilic and in liquid communication with a wick which leads water away from the end surface, such as to the condensate accumulator. Water can then flow by gravity, or be pumped, for possible treatment and returned to the fuel cell stack as coolant. The wicking may be suitably treated hydrophilic metal plates or rods or carbon sheets, or other water-permeable wicking. The hydrophilic end surface and wicking prevent pooling of water as the fuel cell system shuts down, and prevents plugging of flow channels during normal operation.

The hydrophilic end surface and wicking may be used with plate-fin or finned tube condensers, whether having horizontal condensate flow or vertical condensate flow (or therebetween). The condensate flow paths may be partially or completely rendered hydrophilic to prevent mid-passageway pooling of water. One or both sides of the fins, or the plates, or both, or insides of tubes, may be hydrophilic.

In another embodiment, the fins of a plate-fin type heat exchanger extend beyond the plates so that there is no total occlusion of the flow at the ends of the flow paths and the condensate will necessarily drip off the fins, leaving the passageways not blocked with water. In a similar embodiment, alternative fins of a finned tube heat exchanger extend beyond adjacent fins to avoid low-flow pooling. In an embodiment in which condensate flows in tubes of a finned tube type heat exchanger, the tubes extend beyond the fins, and a downwardly-depending portion of the tubes at their ends are removed so that total occlusion will not occur.

Yet other embodiments provide condensing heat exchangers which are tilted somewhat to enhance runoff of condensate during operation and particularly during shutdown. In these embodiments, the ends of the condensate conducting passageways define, for instance, a plane or a line, and the plane or line is mounted within the fuel cell power plant at an angle of between about 0° and 20° with respect to the fuel stack. The angle may preferably be about 17°.

The various embodiments herein are highly suitable for use in mobile applications, such as in vehicles having electric motors driven by fuel cells. However, the embodiments herein are also highly useful in stationary fuel cell power plants.

Other variations will become more apparent in the light of the following detailed description of exemplary embodiments, as illustrated in the accompanying drawings.

MODE(S) OF IMPLEMENTATION

Figure 1:
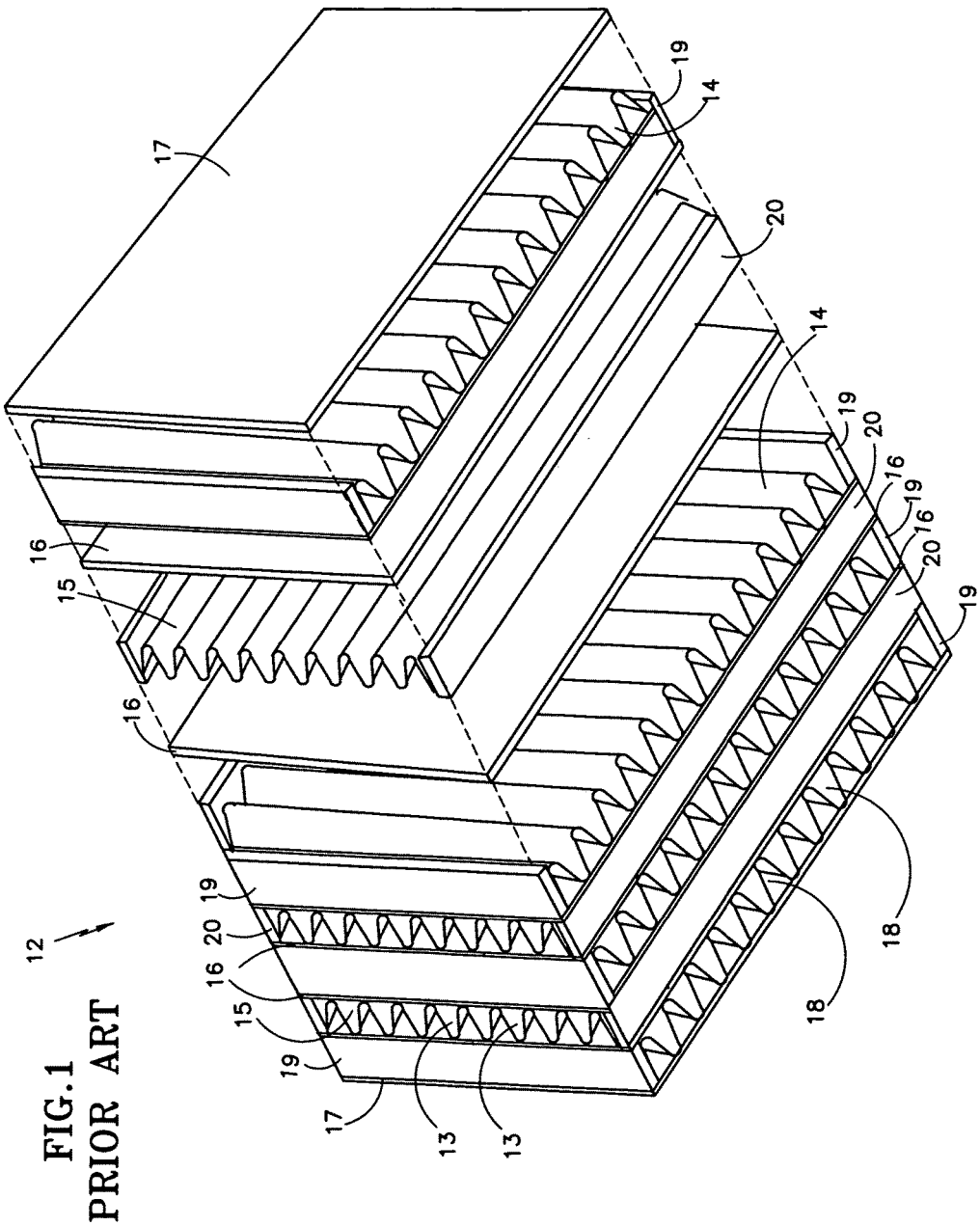
FIG. 1 is a partially expanded, perspective view of a plate-fin type heat exchanger known to the art.

Referring to FIG. 1, a plate-fin type of heat exchanger 12 known to the prior art, has a plurality of corrugated fins 14, 15, the fins 14 being vertical and the fins 15 being horizontal. Each fin 14, 15 is disposed between a thin plate 16 or a thicker end plate 17. The thin plates 16 lay on the corrugations 14, 15 between side walls 19, 20, the spaces 18 between the vertical corrugations 14 and the thin plates 16 (or end plates 17) both to the left and to the right of the corrugations 14 are used for the flow of exhaust from the cathodes from which water vapor is to be condensed. The horizontal flow 13, to the right and to the left of the horizontal corrugations 15 between the thin plates 16 (or the end plates 17) is for the coolant flow, that is, the flow that will cool the plates and vertical fins 14 sufficiently so as to condense the required moisture from the vertical flow.

Figure 5:
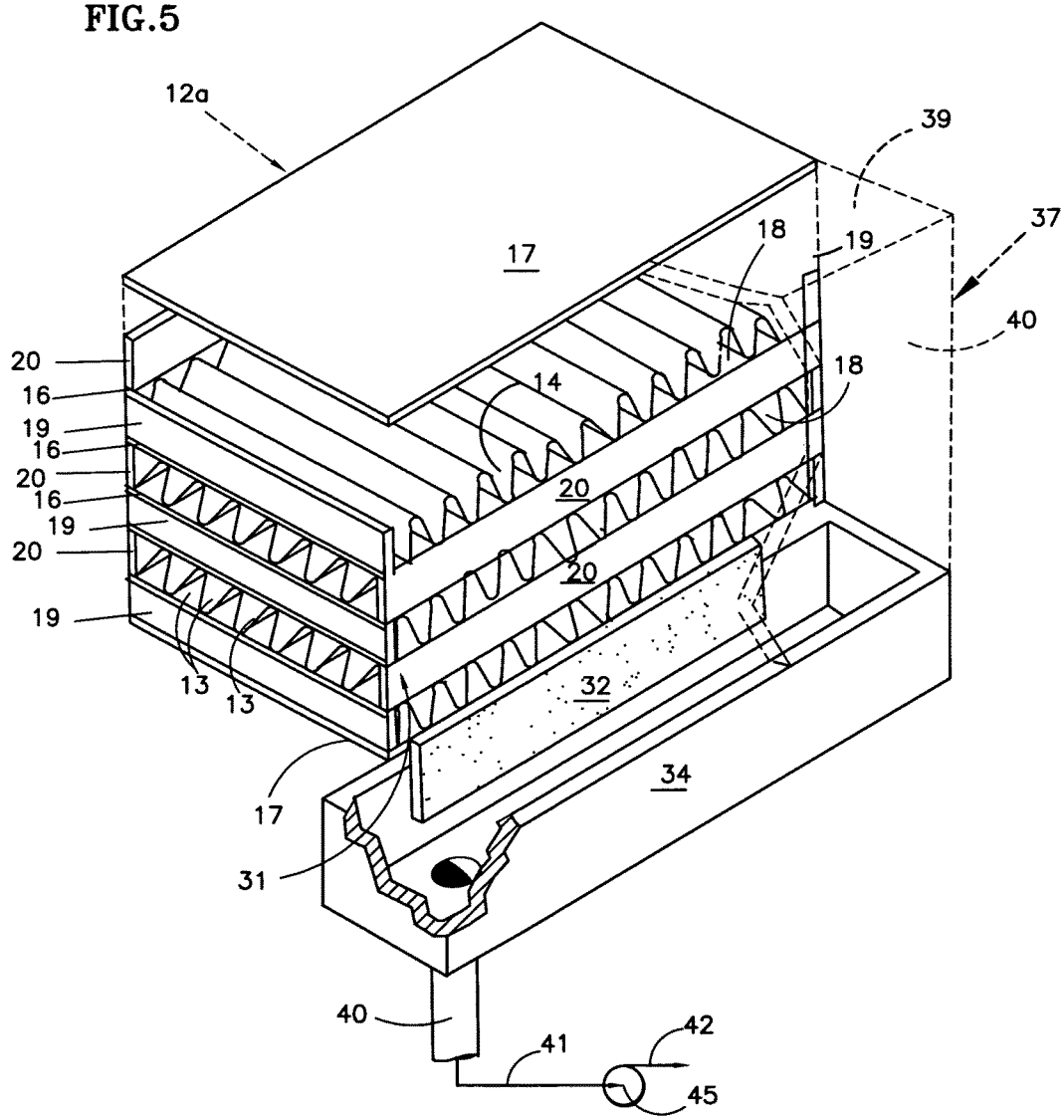
FIG. 5 is a perspective view of a horizontal plate-fin type of heat exchanger having all of the end surfaces of the condensate conducting tubes being hydrophilic and in liquid communication with wicking leading into a condensate accumulator, in accordance with still another embodiment of the invention.

So long as there is sufficient flow of humidified gas downwardly on either side of the vertical corrugations 14, all of the water that has condensed around the corrugations 14 will flow downwardly into an accumulator (conventional, shown in FIG. 5). However, whenever the flow subsides, as when shutting down a fuel cell power plant, the water in the very fine spaces between the corrugations (which are on the order of millimeters) will pool up, due to a relatively high contact angle of the water against stainless steel sides (for instance), and as the flow stops, many or all of the ends of the vertical corrugations will have water blockages. If the fuel cell power plant should be in an environment which goes below the freezing temperature of the water, then ice will form, blocking the passages, which will prevent flow of air from (and therefore to) the cathodes, thereby inhibiting startup operations.

Figure 2:
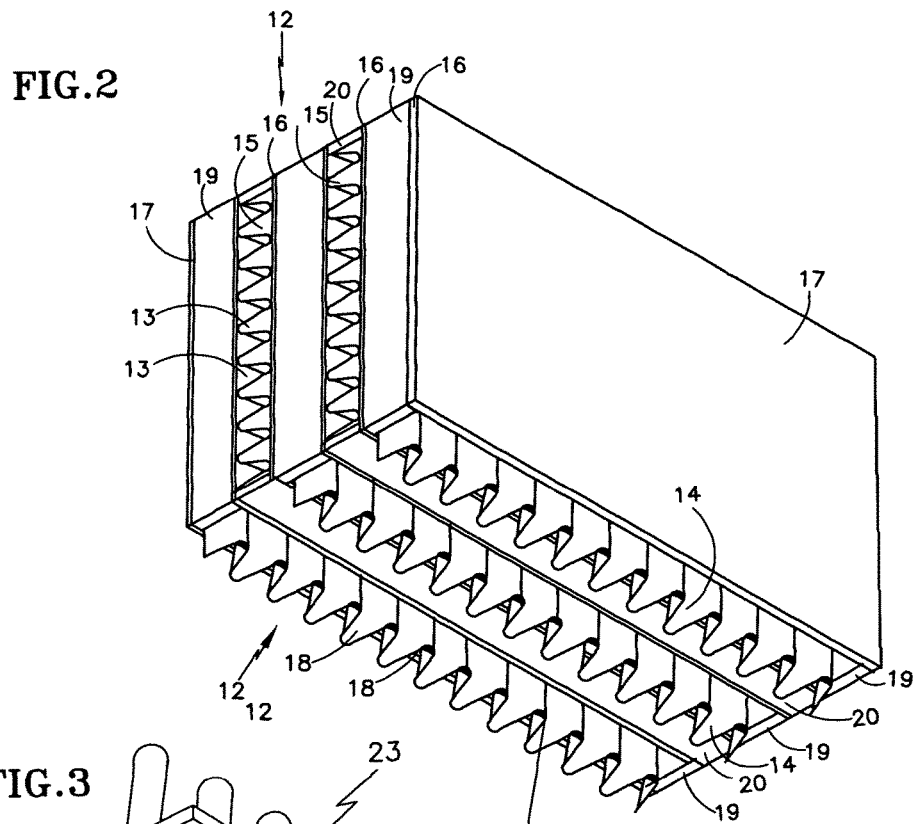
FIG. 2 is a fragmentary, perspective view of a plate-fin type heat exchanger of the type shown in FIG. 1, with extended fins in accordance with an embodiment hereof.

Referring to FIG. 2, one embodiment 21 herein extends the vertical fins 14 beyond the plates 16, 17 so that the ends of the flow paths are no longer completely occluded. This prevents pooling of the water and avoids freezing. The embodiment 21 may have vertical cathode exhaust paths, as shown, or horizontal cathode exhaust paths.

Figure 3:
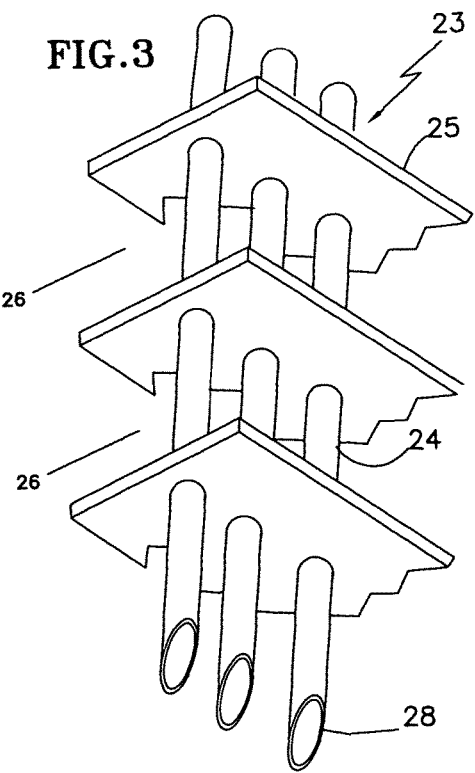
FIG. 3 is a fragmentary perspective view of a finned tube type heat exchanger with vertical condensate tubes which are extended in accordance with another embodiment hereof.

Referring to FIG. 3, an extended finned tube embodiment 23 comprises a plurality of vertical hollow tubes 24 extending through fins 25, only three of which are shown for simplicity, although many fins and tubes are required in practice. The tubes are hollow and intended for a flow of cathode exhaust that is to be at least partially condensed. The ends of the tubes 28 are shaped, such as by being cut at a suitably low angle, so that there is adequate tube surface which is not totally occluded, thereby preventing pooling when the flow of fluid diminishes, such as during shutdown of a fuel cell stack. The coolant flows in spaces 26 between the tubes.

Figure 4:
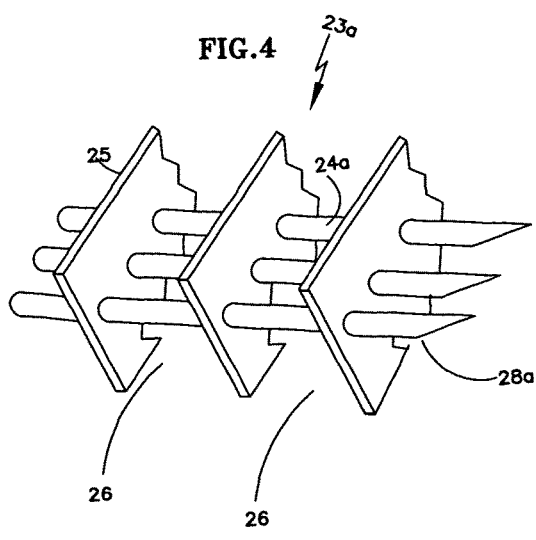
FIG. 4 is a fragmentary perspective view of a finned tube type heat exchanger with horizontal condensate tubes which are extended in accordance with another embodiment hereof.

FIG. 4 illustrates a similar embodiment 23a which, however, has horizontal condensation tubes 24a, the ends 28a being shaped so as to open downwardly, thus avoiding occlusion and pooling of liquid.

For balance of heat considerations, it may be preferable to have coolant (such as glycol) flow through the tubes with cathode exhaust flowing between the fins, as described hereinafter with respect to FIG. 9.

Referring to FIG. 5, another embodiment 12a illustrates removal of water from condensate fins 14 by causing a large fraction (more than about half) of all of the end surfaces 31 of the heat exchanger, at and near the outlet ends of the condensate flow paths (to the right as shown in FIG. 5), rendered hydrophilic and in liquid communication with substantially water-permeable wicking 32 which will lead the water into an accumulator 34. Instead of employing a single wick, the wicking 32 may be supplanted by vertical strips, if deemed appropriate in any given case. The wicking may be any suitable metal with a hydrophilic surface, or carbon paper treated to render it more hydrophilic, or other adequate wicking. The embodiment 12a may have horizontal cathode exhaust flow paths, as shown, or vertical cathode exhaust flow paths.

The accumulator 34 may be part of an outlet manifold, such as a cathode exhaust outlet manifold 37 which is only partially shown in phantom for clarity. The manifold 37 may have a top 39 and a front 40, the front 40 having an exhaust outflow, the details of which are not significant to this embodiment.

From the accumulator 34, the condensate may flow through an outlet 40 along conduits 41, 42, impelled by a pump 45, where appropriate. The condensate may be treated, such as by being passed through a deionizer, heated, or cooled as necessary, and returned to the fuel cell stack as coolant.

If necessary or desired in any given implementation, the condensate flow channels may all have hydrophilic surfaces. The upper surfaces of the fins 14, or the lower surfaces of the fins 14, or both, and the upper or lower surfaces, or both, of the plates 16 (FIG. 1) and the inner surfaces of the end plates 17 may be rendered hydrophilic. It has been found that conduction of liquid to the hydrophilic end surfaces of the heat exchanger in only half of the condensate flow channels will typically be sufficient so that even though the other half are blocked by ice, startup of the fuel cell stack will readily occur with lower air flow. Thereafter, the heat generated by fuel cell reaction will melt the other half, thereby unblocking the remaining half of the flow channels.

Reference to the end surfaces of the heat exchanger, as shown in FIG. 5, means the rightmost end edges of the fins 14, the rightmost side surfaces of the side plates 20 visible in FIG. 5, and the rightmost end surfaces of the side plates 19. Optionally, the rightmost edge of the bottom plate 17 may be hydrophilic as well.

The embodiment 12a may be implemented with finned tube condensers having hydrophilic tube or fin exit edges.

Figure 6:
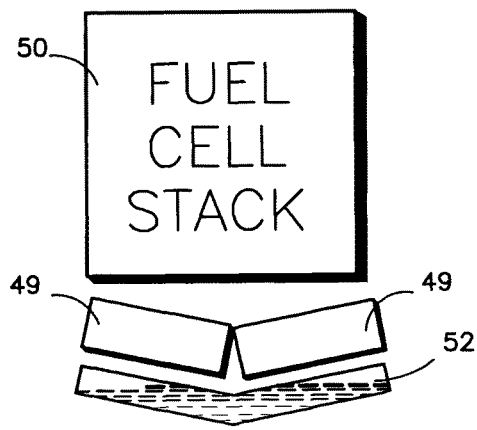
FIG. 6 is a stylized, schematic illustration of a fuel cell stack having tilted condensers to improve liquid flow during shutdown.

The embodiment 12a, if oriented with vertical cathode exhaust paths, may acquire enhanced performance by being tilted edgewise as illustrated in FIG. 6. A pair of condensers 49, are disposed beneath a level fuel cell stack 50 at an angle above 0° but less than about 20°, and preferably about 17°. A single accumulator 52 receives the condensate from both of the condensers 21. The tilting allows the bottom end edges of the extended fins 14 to release water thereon more easily, overcoming a portion of the bubble pressure due to the contact angle.

As defined herein, the term "edgewise" means that the exhaust end of the coolant flow channels, formed around the fins 15, are either higher or lower in the earth vertical sense than the inlet ends of the coolant channels formed by the fins 15.

Figure 7:
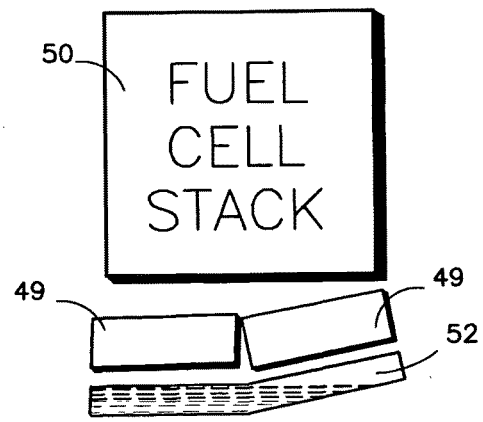
FIG. 7 is a stylized schematic illustration of a fuel cell stack having one tilted condenser, when the fuel cell stack is vertical.
Figure 8:
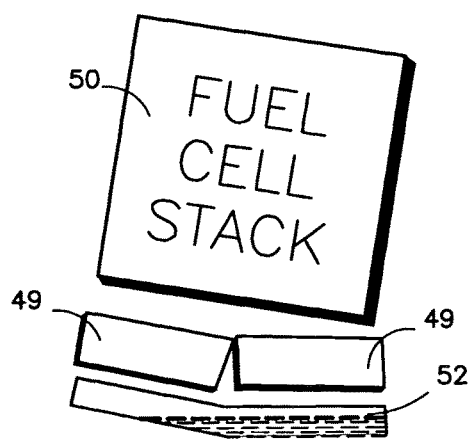
FIG. 8 is a stylized schematic illustration of a fuel cell stack of FIG. 7, when the fuel cell stack is tilted.

Instead of tilting two condensers 21, only a single condenser need be tilted as illustrated in FIGS. 7 and 8. This is because even if not all of the cathode exhaust channels formed by the fins 14 do not clear properly, those in the tilted condenser will clear properly. Thereafter, upon a subsequent startup, all of the channels in the tilted condenser 21 will be open, allowing significant air flow for the subsequent initial startup of the fuel cell stack 50. Upon initial startup, heat generated by the fuel cell reaction will provide sufficient warmth in the cathode outflow to melt the ice in the non-tilted condenser 21 to allow full air flow subsequently.

With only one of the condensers tilted, should a vehicle become tilted due to operation over particular terrain, as illustrated in FIG. 8, the role of the two condensers would simply reverse.

Figure 9:
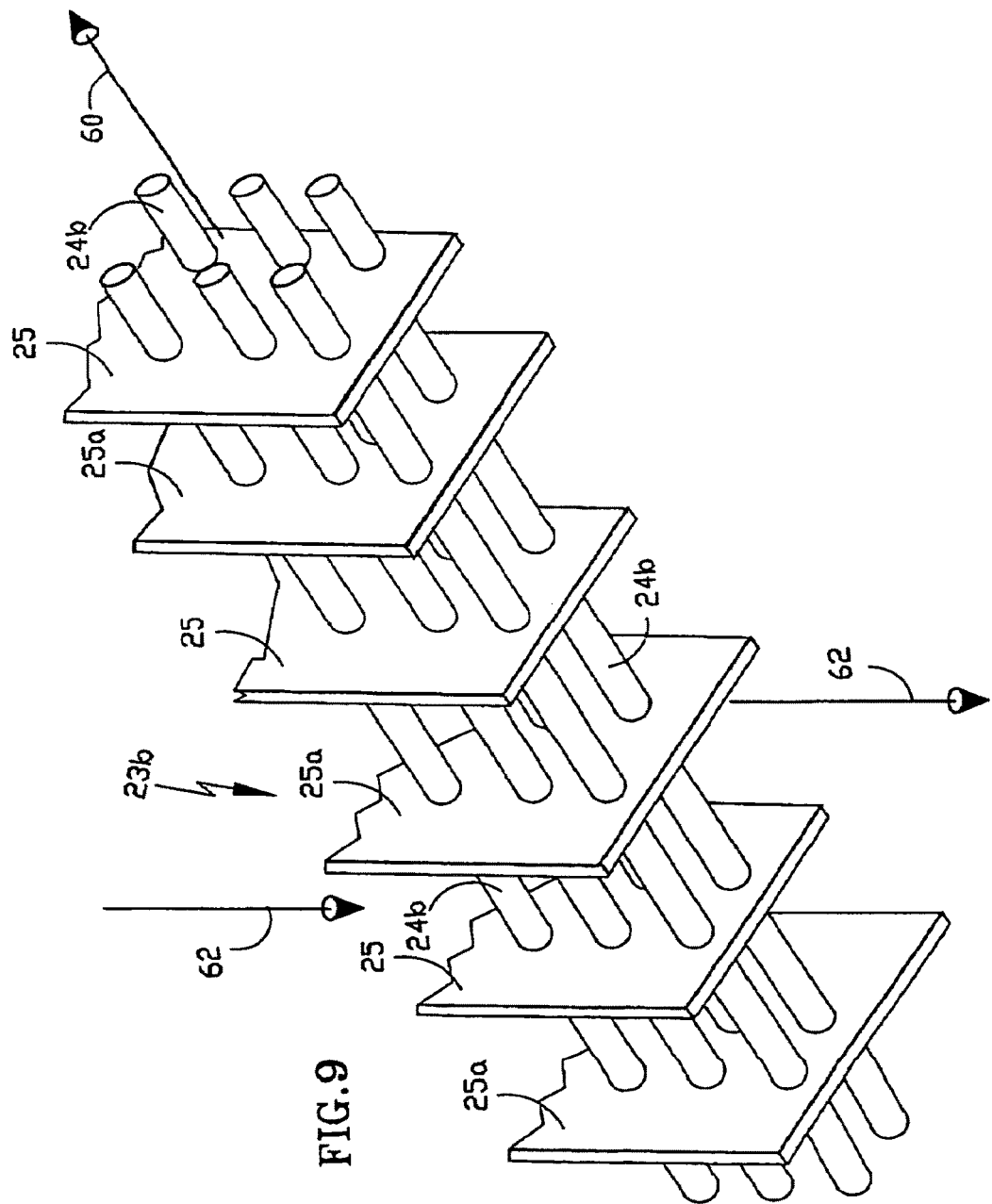
FIG. 9 is a fragmentary perspective view of a finned tube type heat exchanger with vertical fins of which alternate ones are extended in accordance with another embodiment hereof.

FIG. 9 illustrates an alternative finned tube embodiment 23b in which the coolant, such as a glycol solution, flows through the tubes 24b (illustrated by arrow 60) and cathode exhaust flows in the spaces 62 between the fins 25, 25a (as illustrated by arrow 62). The fins 25a extend beyond the fins 25 to prevent pooling of condensate when the fluid flow becomes low, such as at shut down of the fuel cell power plant.

The problem to be solved is avoiding the pooling of water in condensing fluid flow paths so that ice will not form at the exits of the flow channels, and will therefore not block the flow of air upon a subsequent startup of the fuel cell stack. This is particularly true of the cathode exhaust flow paths in evaporatively cooled fuel cell stacks, as the flow through the cathode exhaust flow paths diminishes during shutdown of the fuel cell stack. A common means for doing this is enhancing the removal of water from the exit ends of the reactant fluid flow channels, including end surfaces and surrounding surfaces of the channels. This is achieved by a variety of means such as extended channels, shaped ends of channels, hydrophilic coatings, not only within the channels, but on every edge surface at the exit end of the condenser, and tilting of the condensers.

As used herein, the term "substantially vertical" means within less than 20° of being vertical when the associated fuel cell stack is oriented in a normal, operational position with respect to gravity of the earth.

Since changes and variations of the disclosed embodiments may be made without departing from the concept's intent, it is not intended to limit the disclosure other than as required by the appended claims.

The invention claimed is:

1. A fuel cell apparatus, comprising:
a fuel cell stack that in operation provides a cathode exhaust including evaporated coolant water; and
at least one finned condenser having coolant fluid flow paths, and having condensation fluid flow paths in thermal conductivity with the coolant fluid flow paths and configured to conduct the cathode exhaust, the at least one condenser comprising a finned tube type heat exchanger with tubes extending horizontally through fins;
wherein at least some of the tubes of the at least one condenser extend horizontally beyond the fins of the at least one condenser and have central longitudinal axes that extend horizontally to respective ends of the tubes;
wherein the ends of the tubes are oriented at an oblique angle with respect to the horizontal central axes of the tubes such that openings at the ends of the tubes face downwardly to reduce pooling of condensate during low fluid flow;
wherein end surfaces at fluid exit ends of the condensation fluid flow paths are hydrophilic and in liquid communication with a substantially water-permeable wick configured to remove water away from the fluid exit ends of the condensation fluid flow paths;
at least some of the condensation fluid flow paths are hydrophilic and in liquid communication with the hydrophilic end surfaces of the condensation fluid flow paths; and
wherein the at least one condenser includes first fins alternating with second fins, the first fins extending beyond the second fins to reduce pooling of condensate during low fluid flow.

2. The fuel cell apparatus according to claim 1 wherein:
the at least one condenser is tilted by between about 0° and about 20° with respect to the fuel cell stack when the fuel cell stack is in its operational orientation with respect to gravity of the earth.

3. The fuel cell apparatus according to claim 2 wherein:
the at least one condenser is tilted by about 17° with respect to the fuel cell stack when the fuel cell stack is in its operational orientation with respect to gravity of the earth.

4. A fuel cell apparatus, comprising:
a fuel cell stack that in operation provides a cathode exhaust including evaporated coolant water; and
at least one finned condenser having coolant fluid flow paths, and having condensation fluid flow paths in thermal conductivity with the coolant fluid flow paths and configured to conduct the cathode exhaust, the at least one condenser comprising a finned tube type heat exchanger with tubes extending horizontally through fins;
wherein at least some of the tubes of the at least one condenser extend horizontally beyond the fins of the at least one condenser and have central longitudinal axes that extend horizontally to respective ends of the tubes;
wherein end surfaces at fluid exit ends of the condensation fluid flow paths are hydrophilic and in liquid communication with a substantially water-permeable wick configured to remove water away from the fluid exit ends of the condensation fluid flow paths;
at least some of the condensation fluid flow paths are hydrophilic and in liquid communication with the hydrophilic end surfaces of the condensation fluid flow paths; and
wherein the ends of the tubes are and have ends oriented at an oblique angle with respect to the horizontal central axes of the tubes such that openings at the ends of the tubes face downwardly to reduce pooling of condensate during low fluid flow.

5. The fuel cell apparatus according to claim 4 wherein:
the at least one condenser is tilted by between about 0° and about 20° with respect to the fuel cell stack when the fuel cell stack is in its operational orientation with respect to gravity of the earth.

6. The fuel cell apparatus according to claim 5 wherein:
the at least one condenser is tilted by about 17° with respect to the fuel cell stack when the fuel cell stack is in its operational orientation with respect to gravity of the earth.

* * * * *